United States Patent
Matsunaga et al.

(10) Patent No.: US 6,890,203 B2
(45) Date of Patent: May 10, 2005

(54) CARD CONNECTOR REDUCED IN OPERATING FORCE

(75) Inventors: Akihiro Matsunaga, Tachikawa (JP); Akira Natori, Fussa (JP); Masaaki Shimada, Hamura (JP); Keiichiro Suzuki, Kodaira (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 10/408,465

(22) Filed: Apr. 7, 2003

(65) Prior Publication Data
US 2003/0190832 A1 Oct. 9, 2003

(30) Foreign Application Priority Data
Apr. 9, 2002 (JP) ........................................ 2000/105954

(51) Int. Cl.⁷ ................................................ H01R 13/62
(52) U.S. Cl. ........................ 439/331; 139/326; 139/630; 139/638
(58) Field of Search .......................... 439/331, 629–630, 439/638, 326

(56) References Cited

U.S. PATENT DOCUMENTS

| | | | |
|---|---|---|---|
| 4,761,140 A | * | 8/1988 | Geib ............................ 439/71 |
| 5,224,873 A | * | 7/1993 | Duffet et al. ................ 439/326 |
| 5,320,552 A | | 6/1994 | Reichardt et al. |
| 5,337,220 A | | 8/1994 | Granitz |
| 5,657,081 A | * | 8/1997 | Kurahashi ................. 348/231.7 |
| 5,813,878 A | * | 9/1998 | Kuwata et al. ............. 439/326 |
| 6,174,188 B1 | * | 1/2001 | Martucci ..................... 439/326 |
| 6,383,027 B2 | * | 5/2002 | Cabane et al. ............. 439/630 |
| 6,468,101 B2 | * | 10/2002 | Suzuki ........................ 439/326 |

FOREIGN PATENT DOCUMENTS

| DE | 299 16 766 U 1 | 2/2000 |
|---|---|---|
| JP | 8-162199 | 6/1996 |
| JP | 10-144391 | 5/1998 |

\* cited by examiner

Primary Examiner—Truc T. T. Nguyen
(74) Attorney, Agent, or Firm—Collard & ROe, P.C.

(57) ABSTRACT

In a connector including an insulator (21), a conductive contact (11) held by the insulator, and a cover (31) openable and closable for bring the card into press contact with the contact, the insulator has a holding portion (21) formed at its one end to hold one end portion of the card. On the other hand, the cover has an acting portion (33, 33a) to be engaged with the other end portion of the card to press the card towards the contact when the cover is closed. The card is mounted so as to face a principal surface (21a) of the insulator and brought into contact with a contacting portion (13) of the contact protruding on the principal surface of the insulator. The cover has a pivot portion to be rotatably engaged with the other end of the insulator.

13 Claims, 6 Drawing Sheets

CARD CONNECTOR REDUCED IN OPERATING FORCE

BACKGROUND OF THE INVENTION

This application claims priority to prior application JP 2002-105954, a disclosure of which is incorporated herein by reference.

The present invention relates to a connector (which may be called a "card connector") for use in connection of a small-sized card-like object (which will simply be called a "card" hereinafter) such as a SIM (Subscriber Identity Module).

Figure 1:
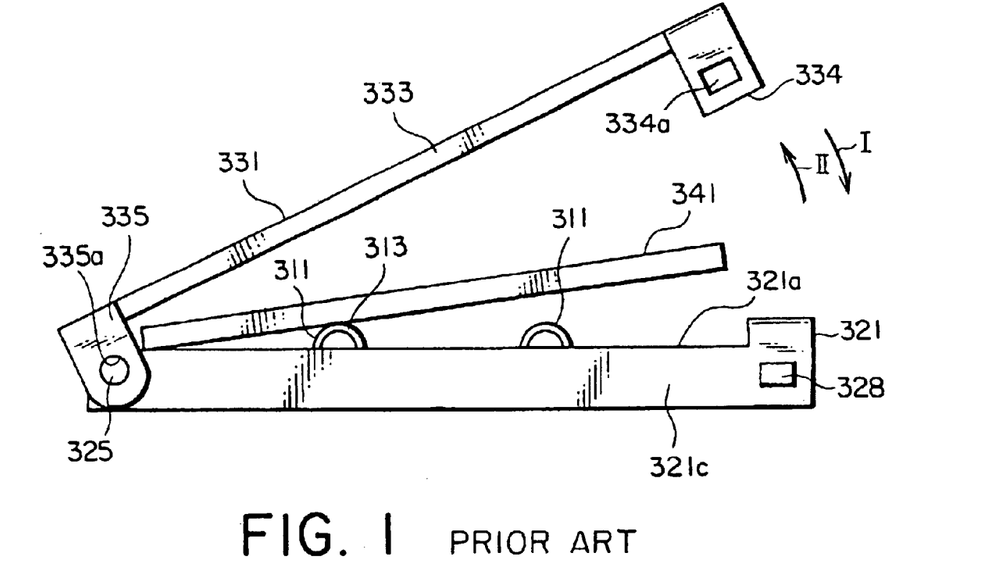
FIG. 1 is a side view of a conventional card connector when a cover is opened.
Figure 2:
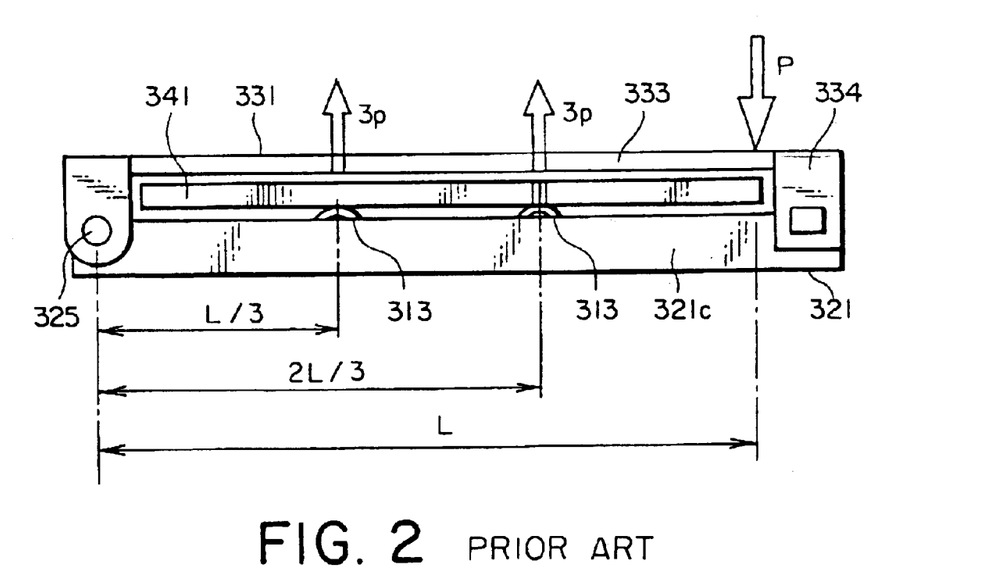
FIG. 2 is a side view of the connector illustrated in FIG. 1 when the cover is closed.

For example, a connector of the type is disclosed in FIGS. 11–16 of Japanese Unexamined Patent Publication No. H08-162199 (JP 8-162199 A). Referring to FIGS. 1 and 2, description will be made of a typical structure of the connector.

The connector illustrated in the figures comprises a plurality of conductive contacts 311, an insulator 321 holding the contacts 311, and a cover 331 for pressing a card 341 towards a principal surface 321a of the insulator 321 to electrically connect the card 341 to the contacts 311. Each of the contacts 311 has a contacting portion 313 protruding on the principal surface 321a of the insulator 321. In the state where the cover 331 is opened as shown in FIG. 1, the card 341 is mounted on the principal surface 321a of the insulator 321. In this event, a plurality of card contacting portions (not shown) of the card 341 are faced to the contacting portions 313 of the contacts 311, respectively. When the cover 331 is pressed and closed as shown in FIG. 2, the card 341 is pressed towards the principal surface 321a of the insulator 321 so that the card contacting portions are brought into press contact with the contacting portions 313.

The insulator 321 has a pair of support shaft portions 325 supporting the cover 331 so that the cover 331 is rotatable in a closing direction I and an opening direction II in which the cover 331 is pressed and closed towards the principal surface 321a of the insulator 321 and in which the cover 331 is separated from the principal surface 321a, respectively. The support shaft portions 325 respectively protrude on a pair of side surfaces 321c of the insulator 321 which are perpendicular to the principal surface 321a.

The cover 331 has a plate portion 333 to face the principal surface 321a of the insulator 321 when the cover 331 is closed, and a pair of bearing portions 335 facing the side surfaces 321c of the insulator 321, respectively. The bearing portions 335 are perpendicularly bent with respect to the plate portion 333. Each of the bearing portions 335 is provided with a shaft hole 335a engaged with each of the support shaft portions 325.

The plate portion 333 further has a pair of engaging portions 334. Each of the engaging portions 334 is provided with an engaging hole 334a to be engaged with each of a pair of engaging protrusions 328 formed on the side surfaces 321c of the insulator 321.

Supposing that the contacting portions 313 are arranged in two rows, three in each row, estimation is made of operating force required to close the cover 331. It is assumed here that the distance from the center of rotation of the cover 331 to a rotating end (substantially equal to the length of the card) is equal to L and that the distances from the center of rotation to the contacting portions 313 in the two rows are equal to L/3 and 2L/3, respectively. In this event, the relationship given by Equation (1) holds:

$$P \times L = L/3 \times 3p + 2L/3 \times 3p, \quad (1)$$

where P represents the operating force required to close the cover 331. From Equation (1), the operating force P required to close the cover 331 by pressing the rotating end of the cover 331 is given by:

$$P = (L/3 \times 3p + 2L/3 \times 3p)/L \quad (2)$$
$$= 3p.$$

The above-mentioned connector utilizes the principle of leverage. However, it is difficult to considerably reduce the operating force P.

The cover 331 is locked only by engagement between the engaging portions 334 and the protruding portions 328 to keep the card 341 in a pressed state. If the engagement is undesiredly released, the cover 331 is easily opened so that the pressed state is no longer kept. Furthermore, the card 341 may unintentionally be dropped off from the connector and damaged.

A similar technique is disclosed in Japanese Unexamined Patent Publication No. H10-144391 (JP 10-144391 A) but has a similar problem.

SUMMARY OF THE INVENTION

It is therefore an object of the present invention to provide a card connector which is capable of considerably reducing operating force.

Other objects of the present invention will become clear as the description proceeds.

According to an aspect of the present invention, there is provided a connector for use in connecting a card. The connector comprises an insulator having a first end, a second end opposite to the first end, and a principal surface extending between the first and the second ends. The card is set to face the principal surface. The connector further comprises a conductive contact held by the insulator and having a contacting portion protruding from the principal surface to be brought into contact with the card and a cover openable and closable for bringing the card into press contact with the contacting portion. The cover has a pivot portion rotatably engaged with the first end of the insulator. The insulator has a holding portion formed at the second end to hold one end portion of the card. The cover has an acting portion to be engaged with the other end portion of the card to press the card towards the principal surface of the insulator when the cover is closed.

DESCRIPTION OF THE PREFERRED EMBODIMENTS

Referring to FIGS. 3 to 6, description will be made of a card connector according to a first embodiment of this invention.

The connector illustrated in the figures is for use in connecting a small-sized card 41, such as a SIM card which is a module for identifying a subscriber such as a telephone subscriber. The connector comprises six conductive contacts 11, a resin insulator 21 having a generally rectangular shape and holding the contacts 11, and a resin or metal cover 31 pivotally supported at a first end 21-1 of the insulator 21. The insulator 21 has an upper or a principal surface 21a extending between the first end 21-1 and a second end 21-2 opposite to the first end 21-1.

Each of the contacts 11 has a leaf-spring contacting portion 13 protruding on the principal surface 21a of the insulator 21, and a terminal portion 15 connected to the contacting portion 13 and extending outward from the insulator 21. The contacting portion 13 has elasticity and is located at a position corresponding to each of a plurality of holes 21e formed in the principal surface 21a of the insulator 21. The contacting portion 13 can rise and sink above and below the principal surface 21a of the insulator 21 through the hole 21e.

The card 41 has a shape and a size adapted to be mounted on the principal surface 21a of the insulator 21. In order to connect the card 41 to the connector, the card 41 is mounted on the principal surface 21a of the insulator 21. When the card 41 is mounted on the principal surface 21a, card contacting portions (not shown) of the card 41 are faced to the-contacting portions 13 of the contacts 11 in one-to-one correspondence.

The second end 21-2 of the insulator 21 is provided with a holding portion 23 for removably supporting one end portion 41a of the card 41. The holding portion 23 has a vertical portion 23a extending upward from the second end 21-2 of the insulator 21, and a horizontal portion 23b extending from an upper part of the vertical portion 23a in a horizontal direction to face the principal surface 21a of the insulator 21. Thus, the holding portion 23 is provided with a recess 24 extending between the principal surface 21a of the insulator 21 and the horizontal portion 23b and laterally opened. When the card 41 is mounted on the principal surface 21a of the insulator 21, the one end portion 41a of the card 41 is inserted into the recess 24 so that the card 41 is locked by the horizontal portion 23b to be prevented from being separated from the principal surface 21a. The insulator 21 is provided with a pair of engaging protrusions 28 respectively formed on a pair of side surfaces 21c in the vicinity of the second end 21-2 to serve as a locking member for locking the cover 31.

The insulator 21 has a pair of support shaft portions 25 formed on the side surfaces 21c at the one end 21-1. Each of the support shaft portions 25 comprises a round-bar-like protrusion. The support shaft portions 25 are located at a distance L1 from an end edge 41c of the other end portion 41b of the card 41 mounted on the principal surface 21a of the insulator 21.

The cover 31 has a cover principal plate portion 33 of a flat shape, and a pair of cover side plate portions 35 perpendicularly bent from a pair of side edges of the cover principal plate portion 33. The cover side plate portions 35 are provided with a pair of pivot portions 35a engaged with the support shaft portions 25, respectively. Specifically, each of the pivot portions 35a is formed by a circular hole fitted with the support shaft portion 25. With this structure, the cover 31 is rotatable around the support shaft portions 25 in a closing direction I and an opening direction II in which the cover 31 is moved towards and away from the principal surface 21a of the insulator 21, respectively.

The cover principal plate portion 33 has a leaf-like spring portion 33a having elasticity. The spring portion 33a protrudes from a surface faced to the principal surface 21a of the insulator 21 and extends from the cover principal plate portion 33 to the pivot portions 35a. The spring portion 33a serves as an acting portion to press the card 41 towards the principal surface 21a when the cover 31 is closed. The spring portion 33a has a free end 33b which is located to correspond to a position between the pivot portions 35a and a rotating end 31a which acts as an operating portion to be operated by an operator. In particular, the free end 33b is placed in the vicinity of the pivot portions 35a.

The cover 31 has a pair of engaging portions 34 formed in the vicinity of the rotating end 31a and perpendicularly bent from a pair of side edges of the cover principal plate portion 33, respectively. The engaging portions 34 are provided with engaging holes 34a to be engaged with the engaging protrusions 28 when the cover 31 is closed.

Next, description will be made of an operation of connecting the card 41.

Figure 4:
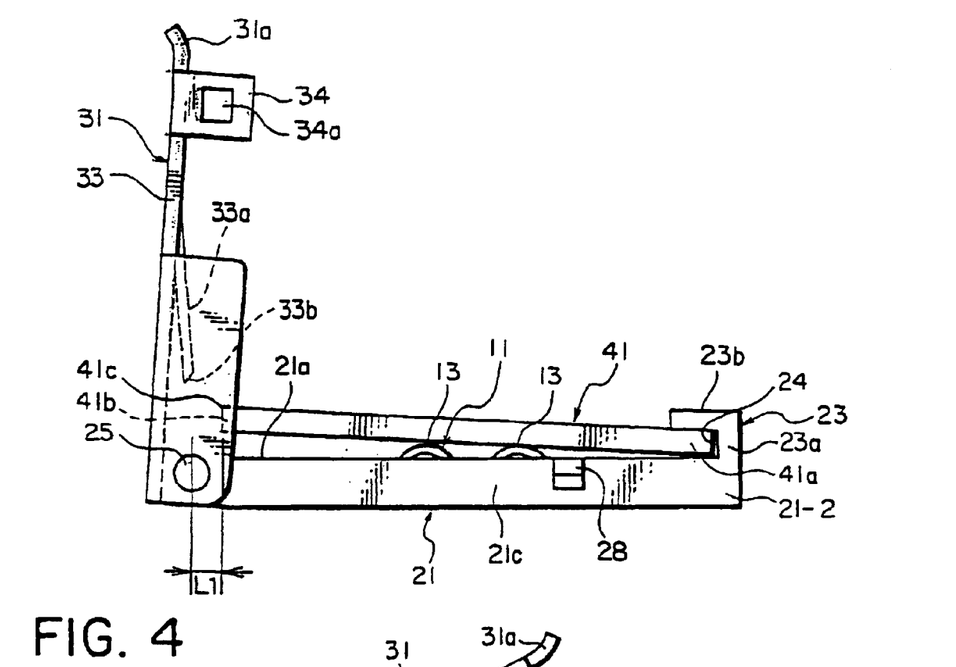
FIG. 4 is a side view of the connector illustrated in FIG. 3 when a cover is opened.

At first referring to FIG. 4, the one end portion 41a of the card 41 is inserted into the holding portion 23 of the insulator 21 while the cover 31 is opened. Then, the card 41 is placed on the contacting portions 13 of the contacts 11. As a consequence, the card 41 is slightly inclined with respect to the principal surface 21a of the insulator 21.

Figure 5:
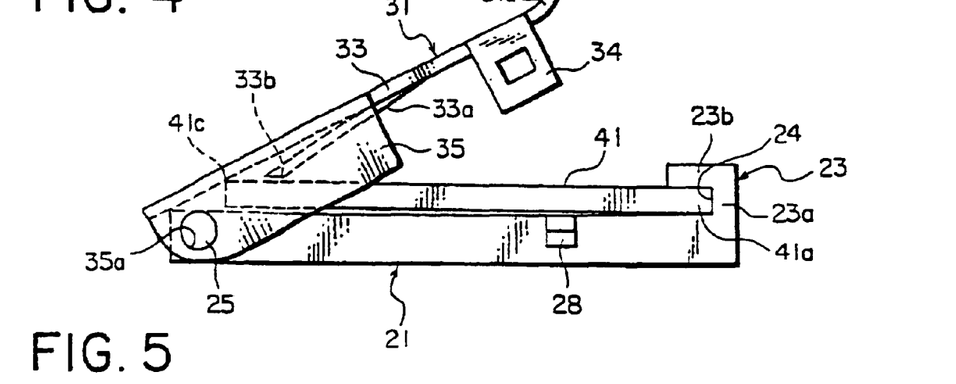
FIG. 5 is a side view of the connector illustrated in FIG. 4 when the cover is halfway closed.

Next referring to FIG. 5, the cover 31 is turned around the support shaft portions 25. In this event, the cover principal plate portion 33 presses the end edge 41c of the card 41 to force the one end portion 41a of the card 41 into the recess 24 of the holding portion 23. The free end 33b of the spring portion 33a is brought into contact with an upper surface of the card 41.

When the cover 31 is turned further, the free end 33b of the spring portion 33a presses the card 41 towards the principal surface 21a of the insulator 21 by the principle of leverage around the support shaft portions 25 as a fulcrum. At this time, the one end portion 41a of the card.41 is held by the recess 24 of the holding portion 23 to thereby act a support point of the card 41. Therefore, the one end portion 41a of the card 41 is prevented from floating up or being separated from the principal surface 21a of the insulator 21.

Figure 6:
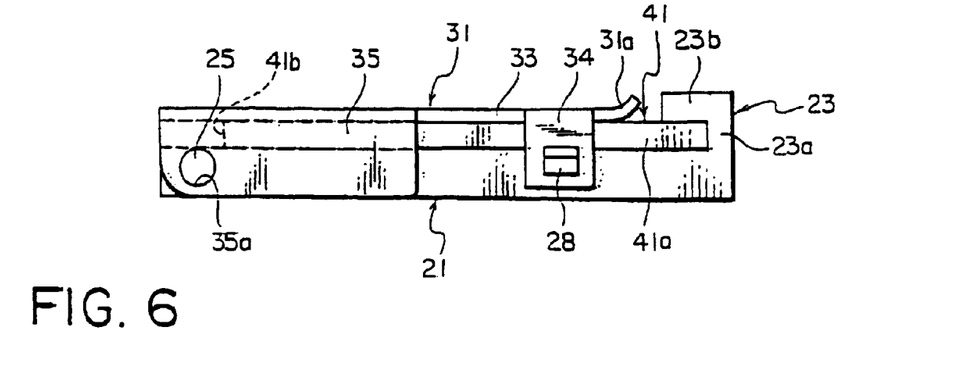
FIG. 6 is a side view of the connector illustrated in FIG. 5 when the cover is completely closed.

When the cover 31 is completely closed as illustrated in FIG. 6, the engaging holes 34a are engaged with the engaging protrusions 28. Therefore, the cover 31 in a closed state is locked to the insulator 21 and inhibited from being opened. In this state, the card 41 is pressed downward by the spring portion 33a, particularly, the free end 33b thereof serving as the acting portion to be substantially parallel to the principal surface 21a of the insulator 21. Thus, the card 41 is brought into press contact with the contacting portions 13 of the contacts 11. In other words, the contacting portions 13 are brought into contact with the card contacting portions of the card 41 with reactive force.

Figure 7:
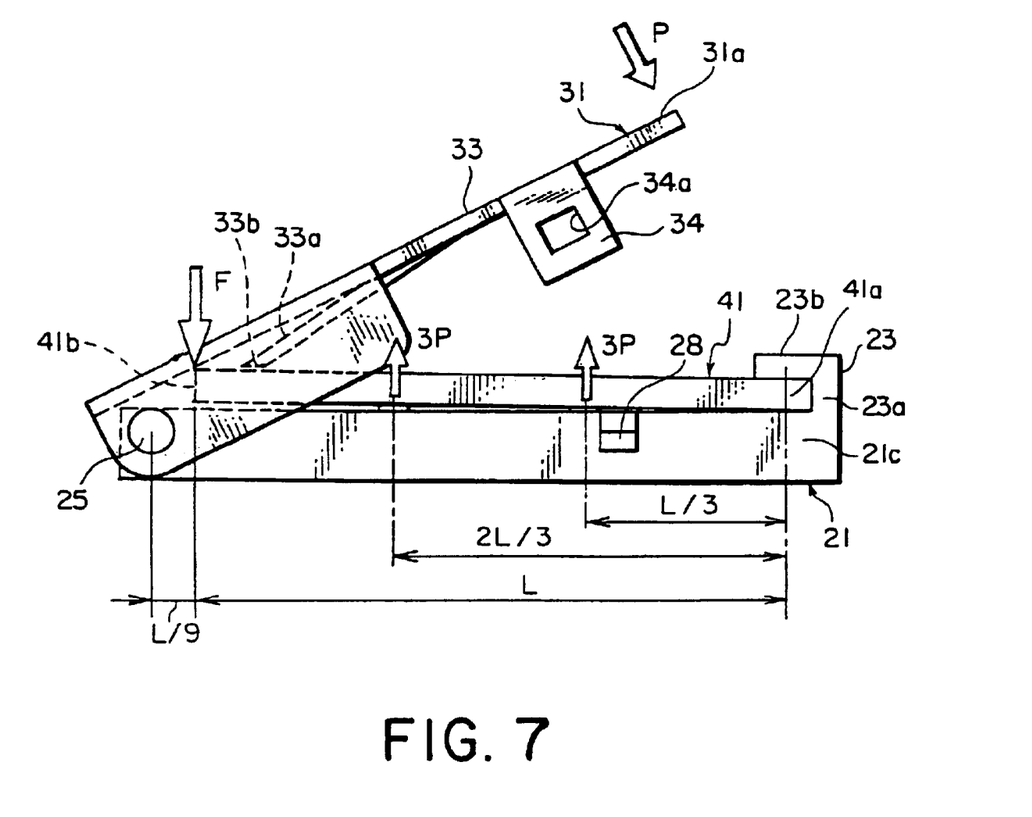
FIG. 7 is a side view for describing an action of the connector illustrated in FIGS. 3 through 6.

Referring to FIG. 7, estimation is made of operating force required to close the cover 31, supposing that the contacting portions 13 are arranged in two rows, three in each row. It is assumed here that the distance between the one and the other end portions 41a and 41b of the card 41 is equal to L and that the distances from the one end portion 41a to the contacting portions 313 in the two rows are equal to L/3 and 2L/3, respectively.

When the cover 31 is closed, force F is applied from the cover 31 to the end edge 41c of the card 41. In this event, the relationship given by Equation (3) holds:

$$F \times L = L/3 \times 3p + 2L/3 \times 3p, \quad (3)$$

Figure 3:
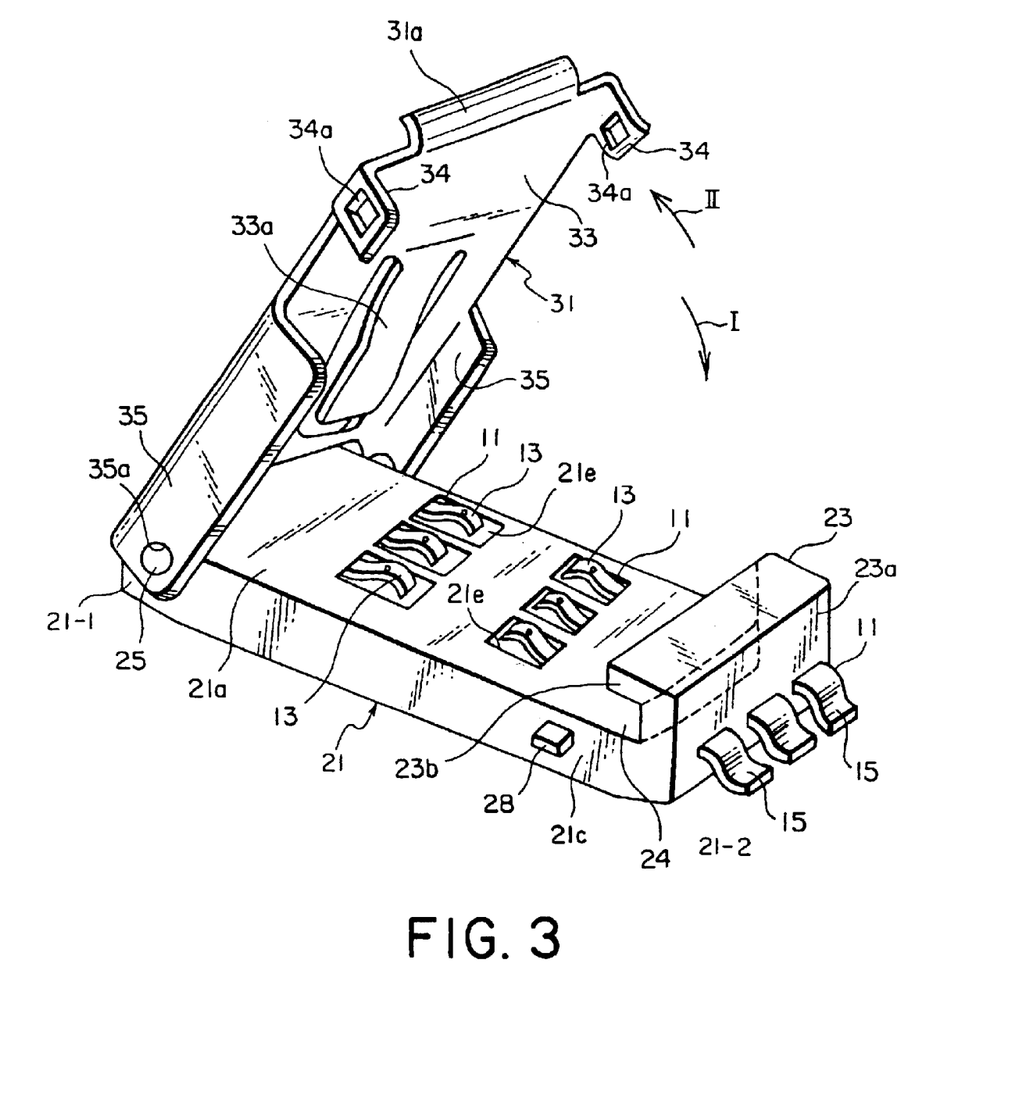
FIG. 3 is a perspective view of a card connector according to a first embodiment of this invention, wherein a cover is opened.

From Equation (3), the force F is given by:

$$F = (L/3 \times 3p + 2L/3 \times 3p)/L \quad (4)$$
$$= 3p,$$

where p represents reactive force of each contacting portion 13 illustrated in FIGS. 3 and 4.

The connector is designed so that the support shaft portions 25 are located at a distance equal to L/9 from the end edge 41c of the other end portion 41b of the card 41 when the card 41 is set at a predetermined position of the insulator 21. For convenience, it will be assumed here that the distance from the support shaft portions 25 to the rotating end 31a of the cover 31 is equal to (L/9+L). In this event, the relationship given by Equation (5) holds:

$$F \times L/9 = P \times (L/9 + L), \quad (5)$$

where P represents the operating force required to close the cover 31. From Equation (5), the operating force P is given by:

$$P = F \times L/9 / (L/9 + L) \quad (6)$$
$$= F/10$$
$$= 3p/10.$$

As compared with the conventional connector described in conjunction with FIG. 2, the operating force required to close the cover 31 is reduced to 1/10.

Figure 8:
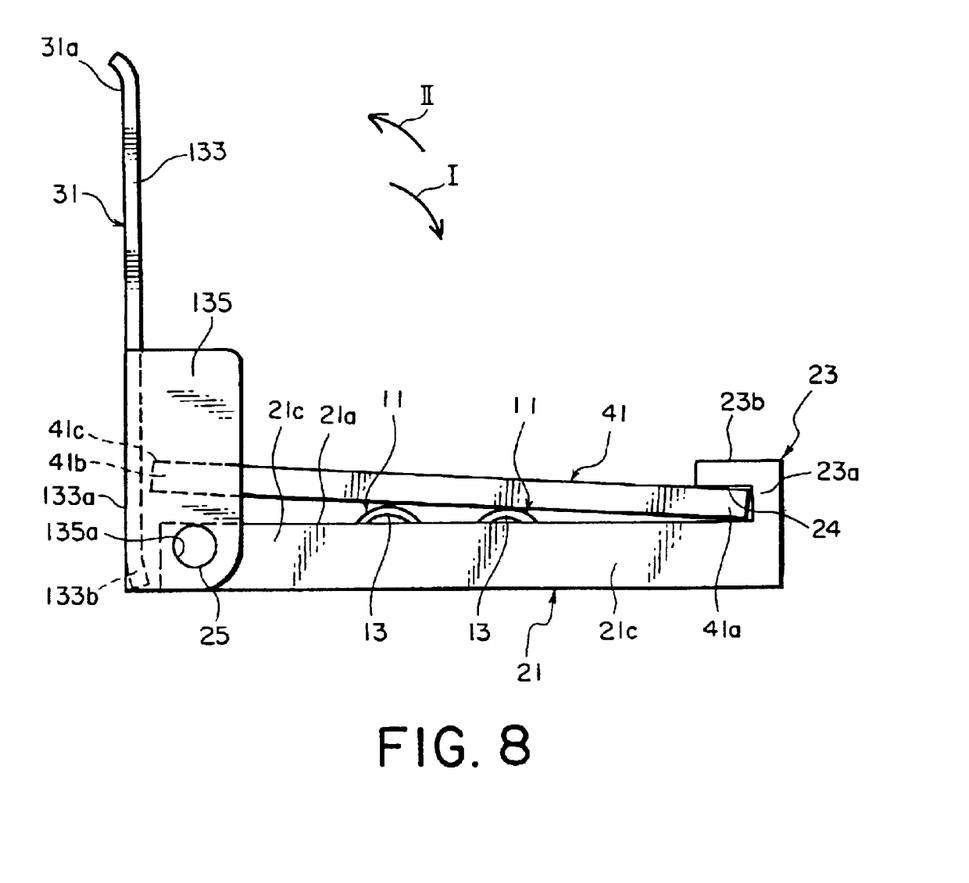
FIG. 8 is a side view of a card connector according to a second embodiment of this invention when a cover is opened.
Figure 9:
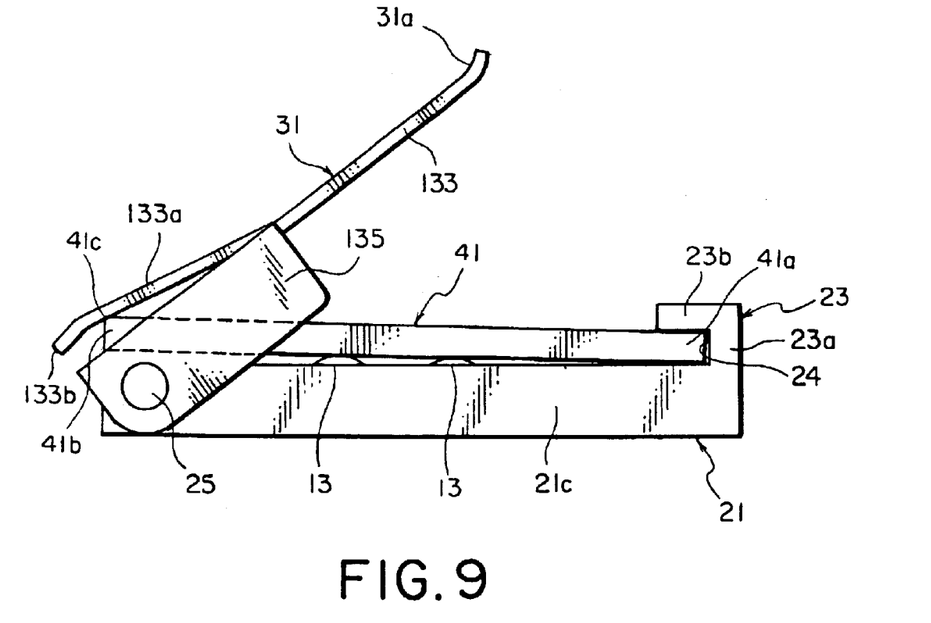
FIG. 9 is a side view of the connector illustrated in FIG. 8 when the cover is halfway closed.
Figure 10:
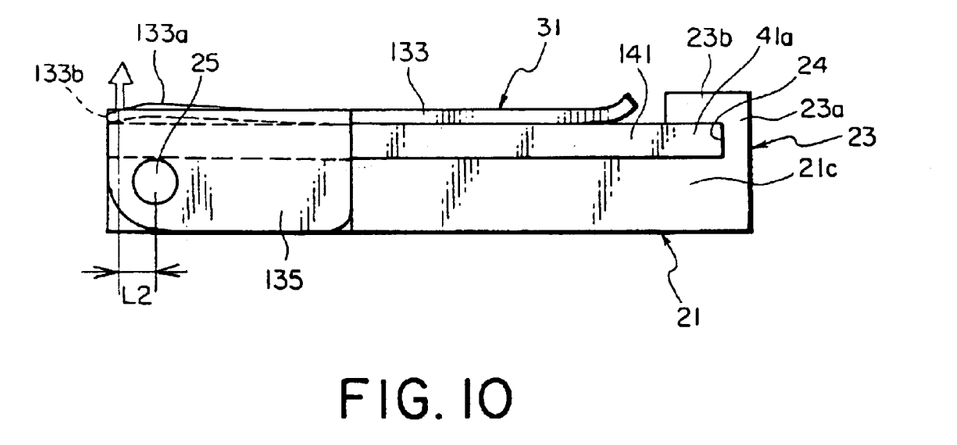
FIG. 10 is a side view of the connector illustrated in FIG. 8 when the cover is completely closed.

Referring to FIGS. 8 to 10, description will be made of a card connector according to a second embodiment of this invention. Similar parts are designated by like reference numerals and description thereof will be omitted.

The connector illustrated in the figures is for use in connection of the card 41, such as the SIM card. In the connector, the cover 31 has a cover principal plate portion 133 of a flat shape and a pair of side plate portions 135 coupled to the cover principal plate portion 133. The cover principal plate portion 133 is a part covering the upper surface of the card 41 when the cover 31 is closed. The side plate portions 135 are faced to the side surfaces 21c of the insulator 21, respectively. Each of the side plate portions 135 is provided with a pivot portion 135a formed by a circular hole. By fitting the pivot portions 135a to the support shaft portions 25 of the insulator 21, the cover 31 is supported to be rotatable around the support shaft portions 25 in the closing direction I and the opening direction II in which the cover 31 is moved towards and away from the principal surface 21a of the insulator 21, respectively.

In the cover principal plate portion 133, a part near the support shaft portions 25 is formed into a leaf spring portion 133a having elasticity. The spring portion 133a is substantially separated from the side plate portions 135. The most part of the spring portion 133a extends to be flush or coplanar with a remaining part of the cover principal plate portion 133 when no external force is applied. However, a free end 133b of the spring portion 133a is slightly bent towards the insulator 21.

Next, description will be made of an operation of connecting the card 41.

At first referring to FIG. 8, the one end portion 41a of the card 41 is inserted into the holding portion 23 of the insulator 21 while the cover 31 is opened. Then, the card 41 is placed on the contacting portions 13 of the contacts 11. As a consequence, the card 41 is slightly inclined with respect to the principal surface 21a of the insulator 21.

Next referring to FIG. 9, the cover 31 is turned around the support shaft portions 25. In this event, the spring portion 133a presses the end edge 41c of the card 41 to force the one end portion 41a of the card 41 into the recess 24 of the holding portion 23 and simultaneously presses the card 41 towards the principal surface 21a of the insulator 21. When the cover 31 is turned further, the spring portion 133a presses the card 41 against the contacting portions 13 of the connector 11 by the principle of leverage around the support shaft portions 25 as a fulcrum. At this time, the one end portion 41a of the card 41 is held by the recess 24 of the holding portion 23 and therefore prevented from floating up or being separated from the principal surface 21a of the insulator 21.

When the cover 31 is completely closed as illustrated in FIG. 10, the free end 133b of the spring portion 133a is brought into press contact with the upper surface of the card 41. Thus, the free end 133b of the spring portion 133a serves as the acting portion elastically pressing the card 41 towards the principal surface 21a of the insulator 21. At this time, the support shaft portions 25 are located at a position between the free end 133b of the spring portion 133a as the acting portion and the rotating end 31a as the operating portion. Furthermore, the free end 133b is located near the support shaft portions 25 but is separated from the support shaft portions 25 by a distance L2 along the insulator 21. Therefore, pressing force of the spring portion 133a and a rotary moment by the distance L2 act in the closing direction I. Thus, it is unnecessary to provide a structure for keeping the cover 31 in a closed state.

In this state, the card 41 is pressed downward by the spring portion 133a, particularly, the free end 133b thereof serving as the acting portion to be substantially parallel to the principal surface 21a of the insulator 21. Thus, the card 41 is brought into press contact with the contacting portions 13 of the contacts 11. In other words, the contacting portions 13 of the contacts 11 are brought into contact with the card contacting portions of the card 41 with reactive force.

Like the connector in the first embodiment (FIGS. 3 to 7), the connector described in conjunction with FIGS. 8 to 10 makes it possible to considerably reduce the operating force required to close the cover 31 as compared with the conventional connector described in conjunction with FIG. 2.

What is claimed is:

1. A connector for use in connecting a card, said connector comprising:
   an insulator having a first end, a second end opposite to said first end, and a principal surface extending between said first and said second ends, said card being set to face said principal surface;
   a conductive contact held by said insulator and having a contacting portion protruding from said principal surface to be brought into contact with said card; and a cover openable and closable for bringing said card into press contact with said contacting portion, said cover having a pivot portion rotatably engaged with said first end of said insulator, said insulator having a holding portion formed at said second end to hold one end portion of said card, said cover having an acting portion to be engaged with the other end portion of said card to press said card towards said principal surface of said insulator when said cover is closed;

said cover further having a rotating end to be located near to said holding portion when said cover is closed;

said cover comprising:

a cover principal plate portion to be faced to said card when said cover is closed; and a spring portion coupled to said cover principal plate to serve as said acting portion, said spring portion extending from a position near to said rotating end towards a position near to said pivot portion to form a cantilever spring.

2. The connector according to claim 1, wherein said holding portion has a recess for removably receiving said one end portion of said card.

3. The connector according to claim 1, wherein said insulator has a support shaft portion formed at said first end, said pivot portion rotatably engaged with said support shaft portion.

4. The connector according to claim 1, wherein said cover principal plate portion presses the other end portion of said card towards said holding portion when said cover is halfway closed.

5. The connector according to claim 1, wherein said spring portion presses said card towards said principal surface of said insulator when said cover is halfway closed.

6. The connector according to claim 1, wherein said spring portion presses the other end portion of said card towards said holding portion when said cover is halfway closed.

7. The connector according to claim 1, wherein said acting portion is located at a position between said pivot portion and said rotating end.

8. The connector according to claim 1, wherein said cover has an engaging portion in the vicinity of said rotating end, said insulator having an engaging portion to be engaged with said engaging portion of said cover to inhibit said cover from being opened when said cover is closed.

9. The connector according to claim 1, wherein said pivot portion is located at a position between said acting portion and said rotating end.

10. The connector according to claim 1, wherein said pivot portion and said acting portion are spaced from said rotating end at distances substantially equal to each other.

11. The connector according to claim 7, wherein said acting portion is located in the vicinity of said pivot portion.

12. The connector according to claim 8, wherein said engaging portion of said cover has an engaging hole while said engaging portion of said insulator has an engaging protrusion to be inserted into said engaging hole when said cover is closed.

13. The connector according to claim 9, wherein said acting portion is located in the vicinity of said pivot portion.

* * * * *